United States Patent

Williams et al.

[11] Patent Number: 5,821,708
[45] Date of Patent: Oct. 13, 1998

[54] ELECTRONICALLY COMMUTATED MOTOR CONTROL

[75] Inventors: John Julian Aubrey Williams; Christian John Wade Gianni, both of Auckland, New Zealand

[73] Assignee: Fisher & Paykel Limited, Auckland, New Zealand

[21] Appl. No.: 488,571

[22] Filed: Jun. 8, 1995

Related U.S. Application Data

[62] Division of Ser. No. 810,382, Dec. 19, 1991.

[30] Foreign Application Priority Data

Dec. 19, 1990 [NZ] New Zealand .......................... 236542

[51] Int. Cl.$^6$ ....................................................... H02P 1/22
[52] U.S. Cl. ......................... 318/254; 388/815; 388/811; 318/439
[58] Field of Search ................................... 318/254, 439, 318/138, 600, 602, 610, 806; 388/811, 815, 902, 917

[56] References Cited

U.S. PATENT DOCUMENTS

| | | |
|---|---|---|
| 4,459,587 | 7/1984 | Leuthesser . |
| 4,540,921 | 9/1985 | Boyd, Jr. et al. ........................ 318/254 |
| 4,546,293 | 10/1985 | Peterson et al. .......................... 318/254 |
| 4,857,814 | 8/1989 | Duncan ................................... 318/138 |
| 5,057,753 | 10/1991 | Leuthold et al. ......................... 318/254 |

*Primary Examiner*—John W. Cabeca
*Attorney, Agent, or Firm*—Trexler, Bushnell, Giangiorgi & Blackstone, Ltd.

[57] ABSTRACT

A method and apparatus for controlling the speed of a multi-phase, brushless DC electrically commutated motor (ECM). Voltage is commutated to the windings of the ECM based on rotor position information derived from back EMF or Hall effect sensors. The application of the commutating voltages is arranged such that the voltage applied to the windings always leads the back EMF generated in the windings by a selected constant lead angle. The speed of the motor is then controlled by pulse width modulating (PWM) the voltage applied to the windings of the ECM.

2 Claims, 9 Drawing Sheets

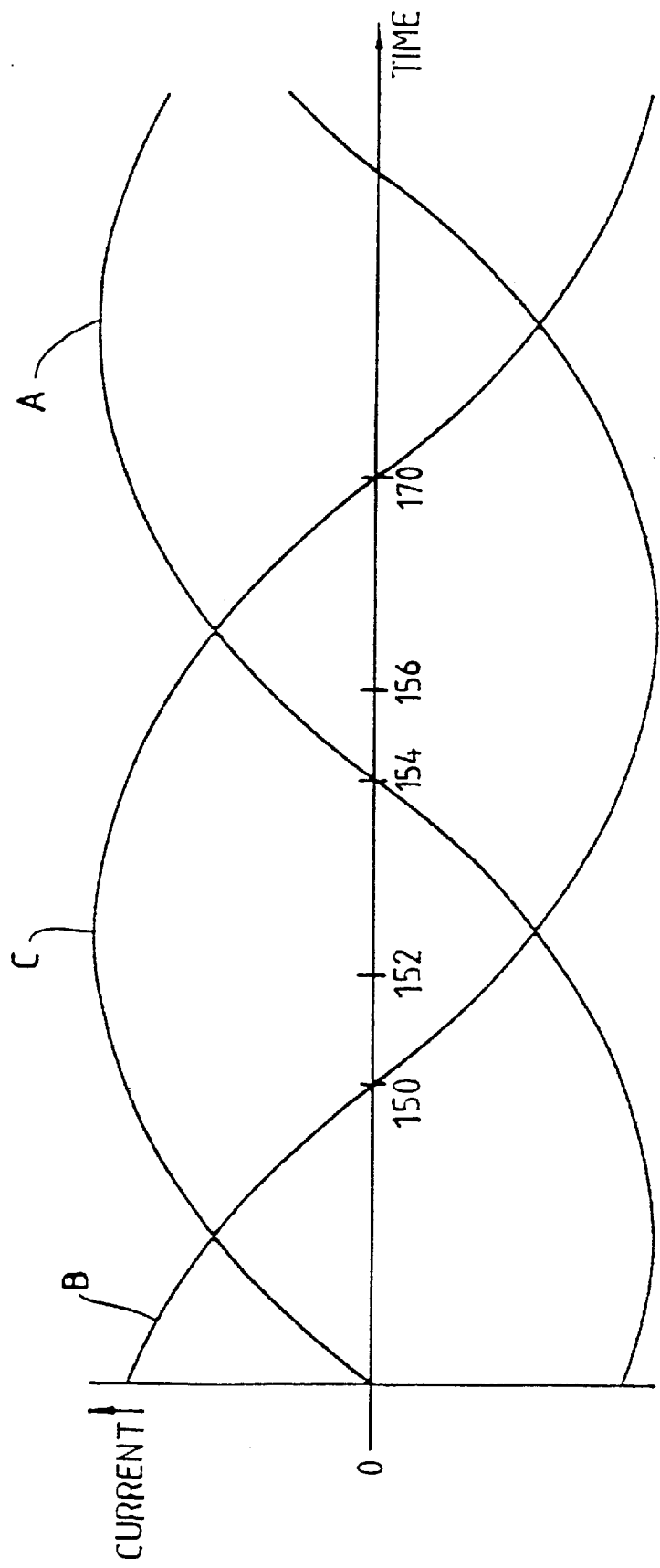

Fig. 10.

TABLE OF EXPECTED HALL PATTERNS

PATTERN # | A | B | C     ← PHASE THAT DIGITAL SIGNAL IS FROM

| PATTERN # | A | B | C |
|---|---|---|---|
| 0 | 1 | 0 | 1 |
| 1 | 1 | 0 | 0 |
| 2 | 1 | 1 | 0 |
| 3 | 0 | 1 | 0 |
| 4 | 0 | 1 | 1 |
| 5 | 0 | 0 | 1 |

Fig. 12.

| OUTPUT PATTERN | PHASE A | PHASE B | PHASE C | |
|---|---|---|---|---|
| 0 | A+ | B-(PWM) | OFF | NON-OVERLAP PATTERN |
| 0 | A+ | B-(PWM) | C-(PWM) | 3 PHASE PATTERN |
| 1 | A+(PWM) | OFF | C- | NON-OVERLAP PATTERN |
| 1 | A+(PWM) | B+(PWM) | C- | 3 PHASE PATTERN |
| 2 | OFF | B+ | C-(PWM) | NON-OVERLAP PATTERN |
| 2 | A-(PWM) | B+ | C-(PWM) | 3 PHASE PATTERN |
| 3 | A- | B+(PWM) | OFF | NON-OVERLAP PATTERN |
| 3 | A- | B+(PWM) | C+(PWM) | 3 PHASE PATTERN |
| 4 | A-(PWM) | OFF | C+ | NON-OVERLAP PATTERN |
| 4 | A-(PWM) | B-(PWM) | C+ | 3 PHASE PATTERN |
| 5 | OFF | B- | C+(PWM) | NON-OVERLAP PATTERN |
| 5 | A+(PWM) | B- | C+(PWM) | 3 PHASE PATTERN |

ELECTRONICALLY COMMUTATED MOTOR CONTROL

This is a divisional of copending application Ser. No. 07/810,382 filed on Dec. 19, 1991.

BACKGROUND OF THE INVENTION

1. Field of the Invention

This invention relates to methods of and/or apparatus for electronically commutated motor control and/or laundry machines incorporating such controls and has been devised particularly though not solely for use in electronically commutated motors (ECM) used for driving laundry machines.

2. Description of the Prior Art

Rotation of a brushless DC electronically commutated motor (ECM) is effected by energising (commutating) the motor phase in a cyclic fashion, so that an attractive force occurs between the magnetic fields of the rotor and stator. In order to maintain rotation, feedback of rotor position is required, so that the phase energisation occurs at the correct time.

In order to receive feedback from the motor it has been common to mount sensors on the motor. For example optical shaft encoders or Hall sensors. However, these sensors have the disadvantage that they require accurate mounting, necessitate running extra wires to the motor and generally run in a harsh environment. These problems make the above options less favourable.

Another method of obtaining the required feedback for commutation, is to look at the back EMF of one of the motor phases. This technique does not require sensors to be mounted in the motor. However to sense the back EMF of a winding, the winding must not be energised, that is, in a three phase motor, current can only flow in two phases at any one time. This has significant disadvantages at high speeds within the numbers of phase windings is large.

The two most commonly used techniques to sense rotor position are:

i) optical or magnetic sensors mounted on or near the rotor, or ii) back EMF sensing.

Each of the above techniques have limitations.

The use of optical or magnetic sensors requires accurate mounting, interconnecting harnesses and the ability for the sensors to operate in harsh environments. Thus this technique, in comparison with back EMF sensing, has more costly hardware overheads.

Back EMF sensing may not have the same hardware limitations as the above sensor technique but it places limitations on the operation of the motor. With back EMF sensing not all phases can be energised while back EMF measurements are being taken and hence motor speed is limited by the supply voltage.

A technique for commutating an ECM is disclosed herein which does not require sensors mounted near the motor and does not limit the back EMF to less than the supply voltage.

When a multi-phase motor is running at a steady speed under equilibrium conditions, there is a phase relationship between the voltage and current waveforms. If we look at the current waveforms, preferably at the zero crossing points of the current waveform, we can infer (calculate) or derive from the information obtained, when to make the next phase commutation, preferably when the changes in speed and operating conditions are small during the period of time from one commutation to the next. This condition applies at high speed, in particular at the high spin speeds, for example, 1100 rpm of a washing machine with high inertial loads.

Modern microprocessors allow the sensing of the current waveforms to be combined with an algorithm to determine the commutation points as well as to control the motor performance.

A method to change from back EMF sensing using an unenergised winding, to using the current zero crossing has also been developed to that optimal motor performance may be achieved over all speed ranges.

The traditional method of speed control in a synchronous motor involves adjusting the phase angel between the applied voltage and the back EMF of the motor windings. To achieve this method of speed control in a multi-phase ECM (which, when running on all phases behaves much like a synchronous motor) would require the additional of specialised hardware to sense the zero crossings of voltage and then calculate the required phase angle. This would add a premium to the price of the ECM and controller and it would therefore be beneficial to achieve speed control of an ECM utilizing the existing commutation control hardware.

It is, therefore, and object of the present invention to provide methods of and/or apparatus for controlling electronically commutated motors and laundry machines incorporating such controls which will go some way towards overcoming the above disadvantages or which will at least provide the public with a useful choice.

Accordingly in one aspect the invention consists in a method con controlling the speed of a multi-phase electronically commutated motor (ECM) having a stator including energisable windings and a rotor, commutating circuitry to supply commutating voltages to said ECM, rotor position sending means, commutation control means for controlling said commutation circuitry, and pulse width modulation means to control the supply of power commutated to said ECM by said commutation control means, said method comprising the steps of:

i) sensing the rotor position at desired intervals of time, ii) applying appropriate commutating voltages to each said winding so that the voltage applied to each said winding leads the back EMF generated in each said winding by a selected constant lead angle, and iii) controlling the supply of power commutated to said ECM with said PWM means to control the speed of said ECM.

In a further aspect the invention consists in apparatus for controlling the speed of a multi-phase electronically commutated motor (ECM) comprising:

a stator including energisable windings and a rotor, commutating circuitry to supply commutating voltages to said ECM, rotor position sensing means for sensing the position of said rotor at desired intervals of time, commutation control means for controlling said commutating circuitry to selectively apply appropriate said commutating voltages to each said winding so that the voltage applied to each said winding leads the back EMF generated in each said winding by a selected constant lead angle, and PWM means to control the supply of power commutated to said ECM to control the speed of said ECM.

The invention consists in the foregoing and also envisages constructions of which the following gives examples.

BRIEF DESCRIPTION OF THE DRAWINGS

The invention will now be described with reference to the accompanying drawings in which:

FIG. 7b is a diagram of phase currents v time in the phases of an electronically commutated motor as sued in accordance with the present invention;

FIG. 10 is a table of expected current sensor output patterns corresponding to those shown in FIG. 9;

FIG. 12 is a diagram showing output commutation patterns used to commutate and ECM in accordance with the present invention.

DETAILED DESCRIPTION OF THE PREFERRED EMBODIMENT

Figure 1:
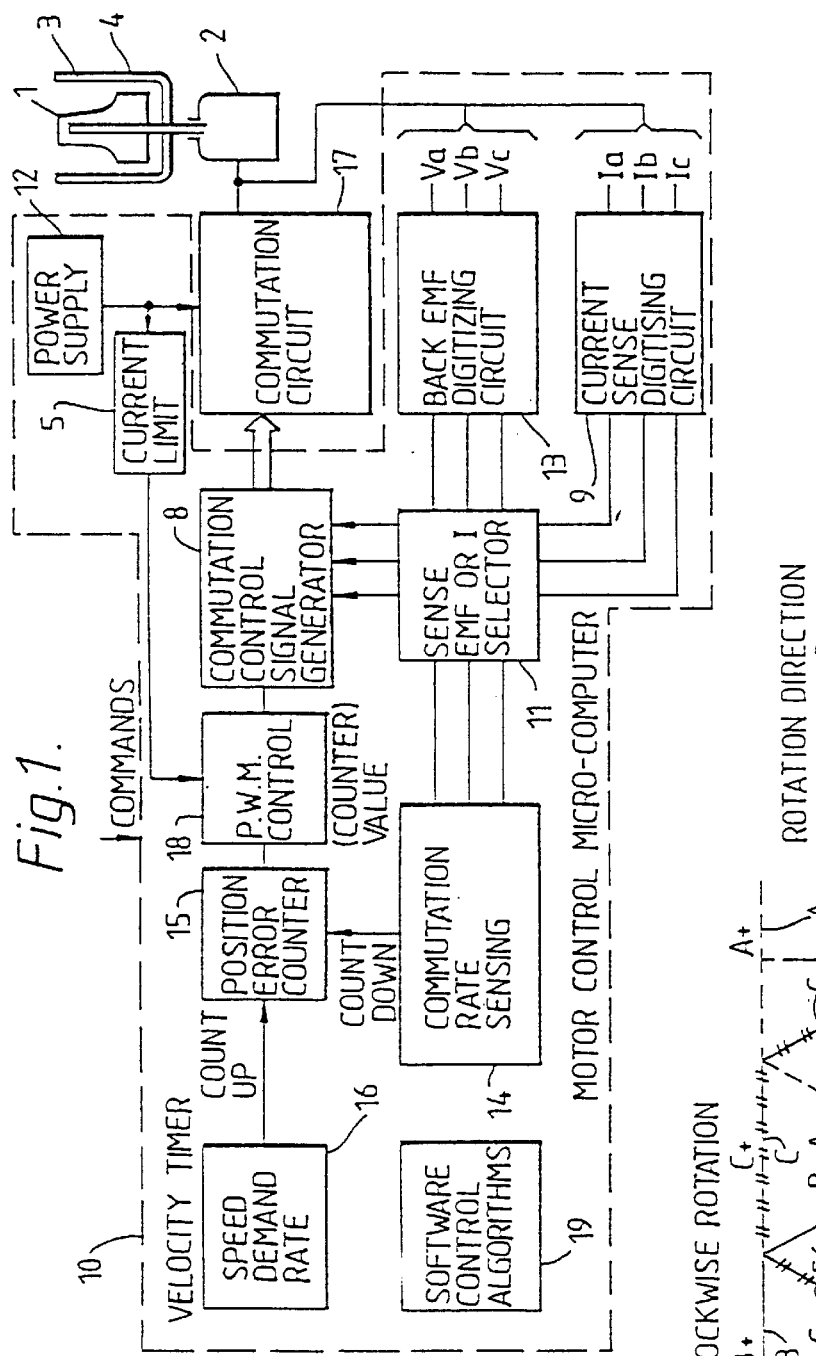
FIG. 1 is a diagram of a motor control and commutation means in accordance with the present invention.

Referring to FIG. 1 of the drawings, and electronically commutated motor (ECM) 2 is shown and is described in detail in the Boyd and Muller U.S. Pat. No. 4,540,921.

The ECM 2 constitutes a stationary assembly having a plurality of winding stages adapted to be selectively commutated, and rotatable means associated with that stationary assembly in selective magnetic coupling relation with the winding stages. The winding stages are commuted with brushes by sensing the rotational position of the rotor as it rotates within the stationary assembly. DC voltage is selectively applied by commutation circuit 17 to the winding stages in preselected orders of sequences.

The control apparatus comprises a general purpose microprocessor 10, for example, a TM5370 which receives commands for example from a console (not shown) having a series of push buttons or other user operable controls. Pulse width modulation (PWM) control means 18 and a commutation control signal generator 8 drive a three phase power bridge commutation circuit 17. The necessary power supplies are fed by a DC Power supply 12. In addition, signals are fed from a winding of the ECM which is unpowered when other windings in the stator of the ECM are under power when the motor is operating below a certain minimum speed of rotation.

A current sense digitizing circuit 9 is also provided and the operation of this circuit will be explained further later. The EMF digitizing circuit 13 and the current sense digitizing circuit 9 are both connected to a selector 11 which provides digitized back EMF signals to the commutation control signal generation 8 when the motor speed is below a certain minimum speed of rotation and provides current sensing digitised signals to the commutation control signal generator when the motor speed is above the minimum speed will be explained further later. Signals from the motor windings are fed to a back EMF digitizing circuit 13, as described in the Boyd and Muller Specification and are thence supplied to the microcomputer 10. Power switching circuits also feed through a current sensing circuit 5 to the microcomputer 10. A loop position error indicator 15 and a speed demand rate velocity timer 15 are provided and a commutation rate sensing device 14 but any other rotor speed and position varying device may be used. Software control algorithms 19 are also provided.

The electric motor 2 (FIG. 1) is an electronically commutated motor (ECM) having a rotor and a stator. The rotor is connected to an agitator 1 and may also be selectively connected to a spin tub 3 in a washing container 4 of a laundry machine. The motor 2 rotates the agitator back and forth to provide and agitation effect on clothes placed in the washing container during an agitation cycle, and the agitator and spin tub are connected together so as to be rotated continuously in one direction during a spin cycle. The commutation switches and control for the ECM 2 are shown in more detailed in FIG. 2. The rotor of the ECM is permanent magnet rotor as described in U.S. Pat. Nos. 4,857,814 and 4,540,921.

At low speeds, for example, below 300 rpm, power is commutated to only two of the three motor phases so that there is always one unenergised winding used to sense back EMF. The back EMF indicates rotor position as disclosed in U.S. Pat. No. 4,857,814. Above 300 rpm the control circuitry in the present invention uses signals derived from the power waveforms preferably the current waveforms in one or more motor windings to calculate when to commutate the motor as explained later.

Figure 2:
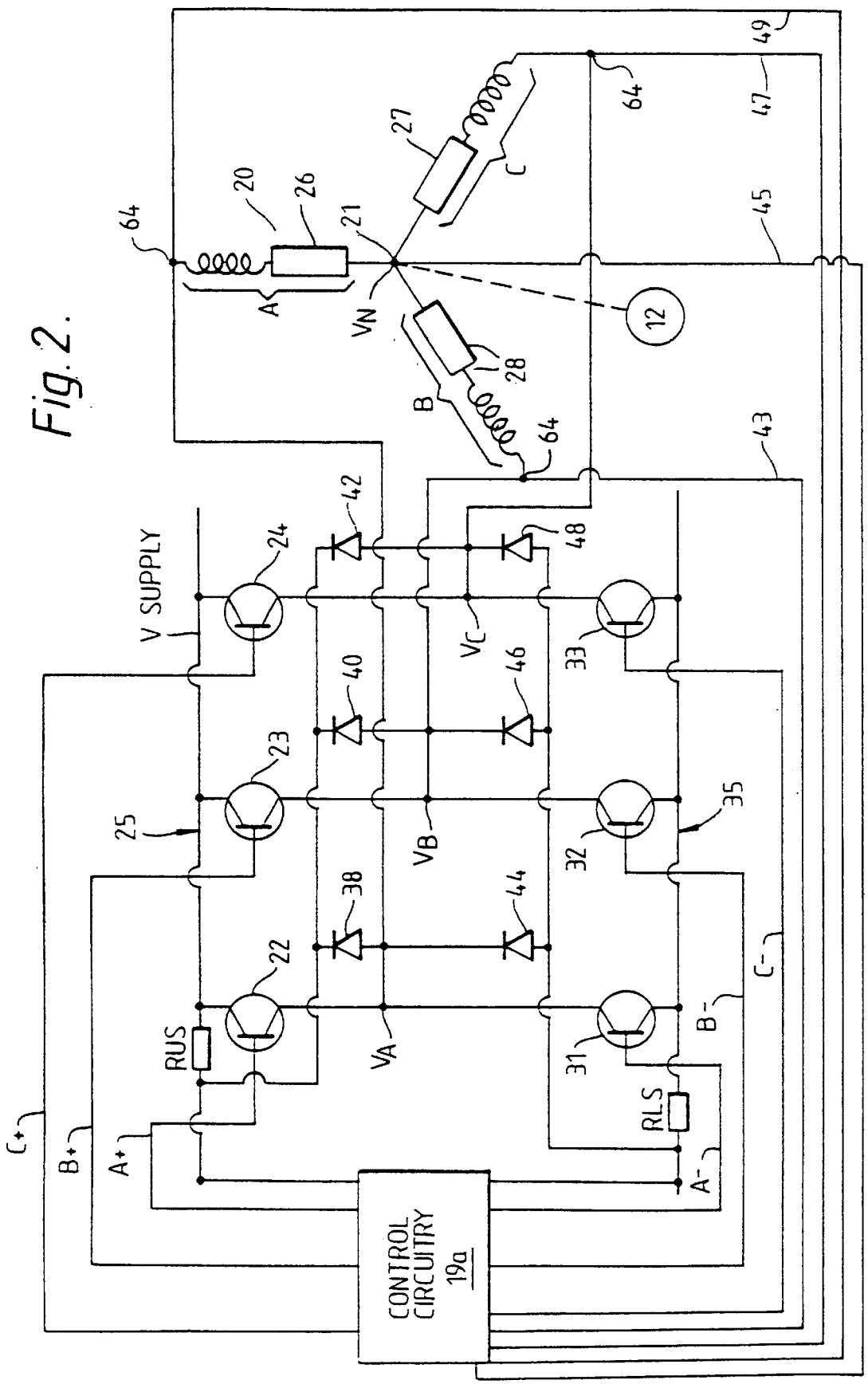
FIG. 2 is a diagram of part of the motor control and commutation means of FIG. 1 shown in more detail.

Thus referring to FIG. 2, there is provided and ECM 2 having three windings or phases A, B and C with a common point 21 and a switching bridge in which three switching devices 22, 23 and 24, which are for example IGT's or FET's, connect the supply positive rail 25 (V supply) from a full wave rectified mains power supply to the windings 26, 27 and 28. Three further switches 31, 32 and 33 connect the ends of the windings to the power supply negative rail 35, the six switches being in a totem pole configuration. The six switches may also be protected by known snubbing circuits (not shown). The upper switches 22, 23 and 24 may be referred to as the A+, B+ and C+ switches and the lower switches 31, 32 and 33 may be referred to as the A−, B− and C− switches. Free wheel diodes 38, 40, 42, 44, 46 and 48 allow currents induced in the windings to be returned to the supply rails in the known way. Connected in series with rail 35 is a lower sense resistor RLS. The RLS resistor is of low value, for example 0.1 Ω and is used for current control. A control means comprising control circuitry 19a is provided to control commutation of power to motor and lines 43, 45, 57 and 49 provide back EMF signals from the motor windings to the control circuitry 19 a.

ECM 2 is commutated using pulse width modulation (PWM) methods and the operation of ECM 2 is more fully described in U.S. Pat. No. 4,857,814 the disclosure of which is incorporated herein by reference.

"To cause the rotor 3 of motor 2 to rotate in a clockwise direction, voltages are applied to the windings from rails 25 and 35 and assuming that winding 26 is A, winding 27 is C and winding 28 is B and that if we wish to have power on the motor at zero degrees such that we have a maximum EMF across the motor and thus maximum torque in the clockwise direction, switches 22(A+) and 33 (C-) would be switched on, connecting power from the positive rail 25 through switch 22 to the A phase windings 20 through the neutral point 21 and the C phase windings 27 through switch 33 to negative rail 35. Thus to obtain maximum torque in the motor the connections would be A+ and C- to the 60 degree angle and then B+ and C- to the 120 degree angle then B+ and A- to 180 degree angle then C+ and A- to the 240 degree angle, C+ and B- to the 300 degree angle, A+ and B- to the 360 degree angle, the sequence commencing at A+ and C- again. Thus three is a sequence of six different patterns and each goes to 60 degree angle of rotation giving a total of 360 degrees in rotation ".

Figure 3:
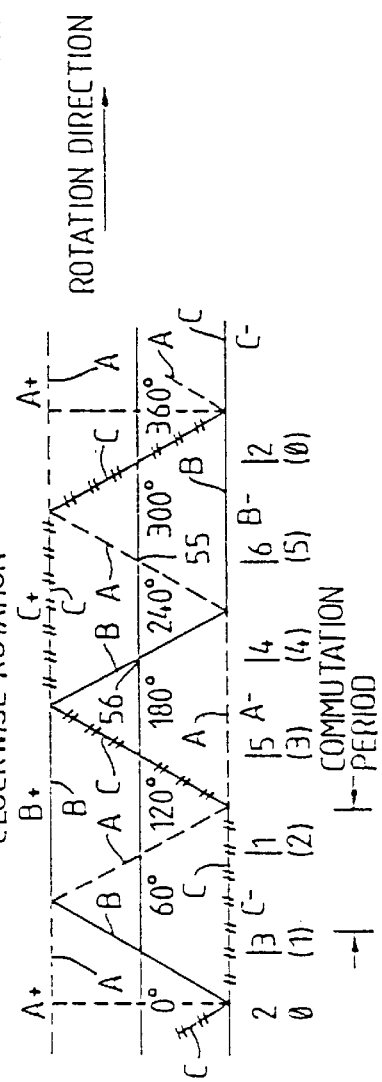
FIG. 3 is a diagram of electromotive forces (EMF's) induced in the windings of a three phase electronically commutated motor for a single electrical rotation of the rotor in degrees, when the rotor is rotated in the clockwise direction.

Looking now at operating the ECM 2 as a generator, that is without power being applied to the windings, if the rotor of the motor is rotated in the clockwise direction and voltage measurements are taken at the ends of the windings 26, 27 and 28 with respect to the star point 21, that is the center of the three phase windings, EMF's will be generated and in FIG. 3 such EMF's have been plotted. FIG. 3 illustrates a single electrical revolution of the rotor in electrical degrees and essentially shows the waveforms of a three phase generator. The voltages induced in the three windings have been indicated in FIG. 3 by the letters A (pecked line), B (full line) and C (slashed line). For example in A winding it will be seen that in FIG. 3 the EMF goes from a maximum Positive at zero degrees through zero voltage to a maximum Negative, at 180 degrees than goes from maximum negative through zero voltage to maximum Positive at 360 degrees thus completing one electrical cycle.

When the ECM is operating under steady state conditions under power its internal operating characteristics approximate those of a synchronous motor. The back EMF's are generated as described above in relation to operating only as a generator.

Figure 4:
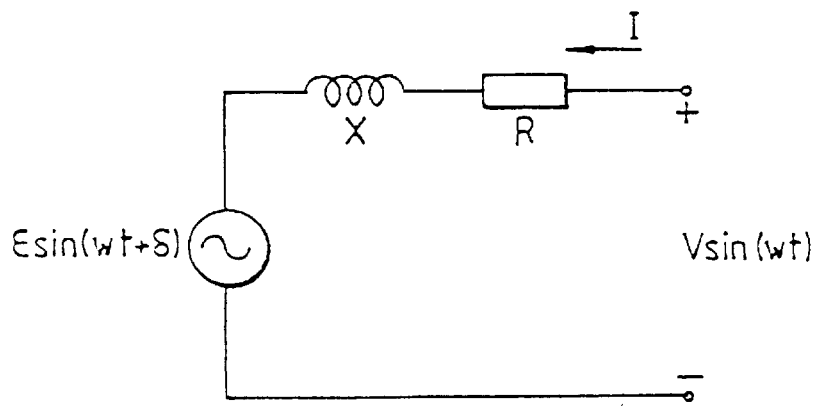
FIG. 4 is a simplified equivalent circuit diagram for a synchronous motor.

Referring to FIG. 4, and equivalent circuit for a synchronous machine operating as a motor is shown in which the voltage applied to the stator terminal windings is represented by V sin (ωt) and the back EMF induced in the windings is shown and E sin (ωt+δ). The resistance of the windings is represented by resistor R and the reactive component of the overall winding impedance is represented by inductance X. Although the diagram of FIG. 4 assumes that the applied and induced voltages and currents flowing through the windings are sinusoidal, the ECM of the present invention when operating at speed as a synchronous machine will very closely approximate the equivalent circuit shown in FIG. 4. Commutation of the machine establishes a phase relationship between the currents flowing in said windings and EMF's induced therein. In FIG. 4, it is assumed that the voltage applied to the windings leads the back EMF by and angle δ which is representative of the phase angle between the interacting magnetic fields in the machine, that is the principal axis of the field of the stator windings being commutated and the principal axis of the appropriate rotor field and therefore determines the torque produced by the motor.

Figure 5:
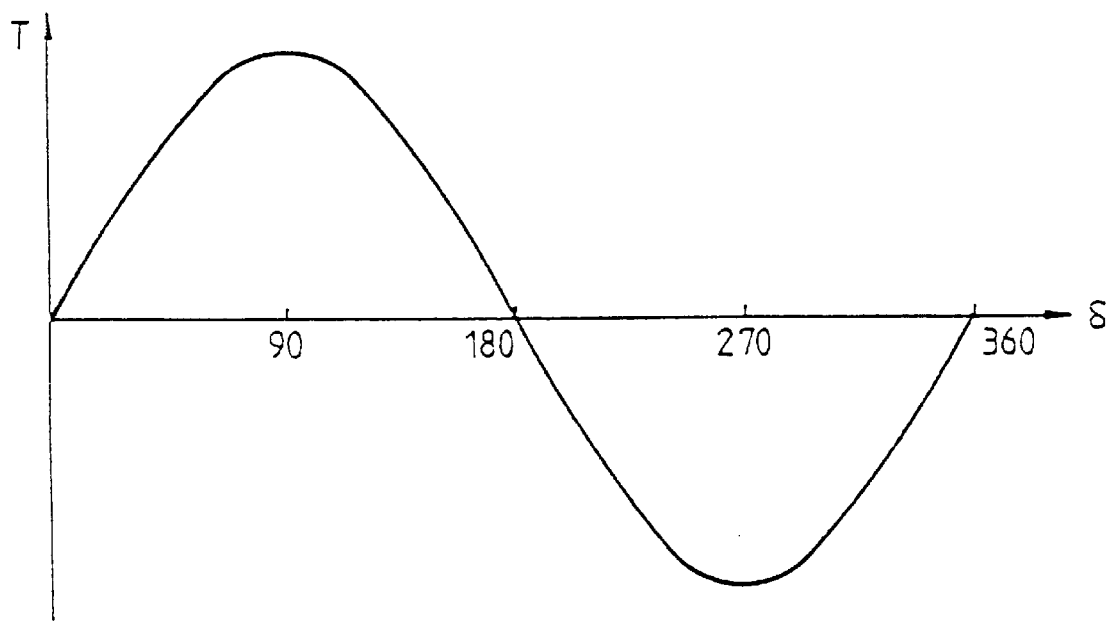
FIG. 5 is a graph of Torque v the angle between a principal magnetic axis of the stator of an ECM and the appropriated rotor pose in electrical degrees.

Referring to FIG. 5, when the angle δ is between 0 degrees and 180 degrees electrical, a positive torque is produced and as δ increases from 0 degrees to 90 degrees the torque also increases to a maximum at 90 degrees and then decreases between 90 degrees and 180 degrees. If the applied voltage across the winding terminals lead the back EMF by more than 180 degrees electrical then negative torque is produced and the motor acts as a generator. The negative torque increases if it is between 180 degrees and 270 degrees and decreases between 270 degrees and 360 degrees. If δ is made sufficiently large so that the voltage applied to the motor windings leads the back EMF by 180 degrees to 360 degrees, then the motor may also be made to act as a generator so the motor may be effectively braked.

Referring to FIG. 4 once again we note that R is generally small and may be neglected at high speeds as it is insignificant compared with X which is proportional to speed. Neglecting the resistance R allows the phasor diagrams of FIG. 6(a, b) to be drawn being a very approximate representation of the ECM at high speeds. For sinusoidal currents to be sustained a relatively large motor inductance is required for example 30 millihenries per phase. Note the magnitudes and angles drawn are for explanation only and are not meant to represent any particular motor.

Figure 6A:
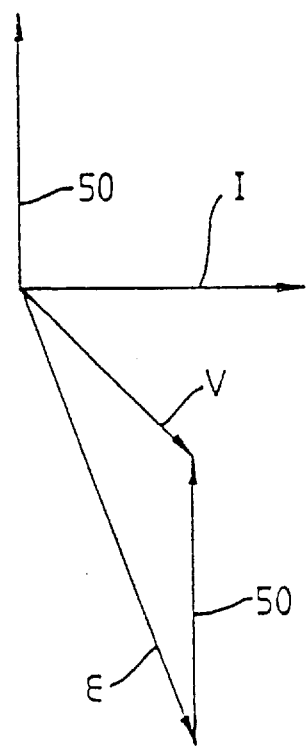
FIG. 6a is a phasor diagram of the principal voltages and currents in an electric motor as used in accordance with the present invention with the motor current leading the driving voltage and with the phasors rotating in the anticlockwise direction.

As can be seen from FIG. 6a there is a phase relationship between the driving voltage V and the motor current I. This relationship is influenced by the back EMF voltage E. The vector sum of the voltage across the inductor represented by phasor 50 and the back EMF voltage equals the voltage across the motor windings. In FIG. 6a the current I leads the driving voltage V.

The shape of this phasor diagram changes if the operating conditions are changed for example, and increase in the supply voltage or a change in the motor parameters.

Figure 6B:
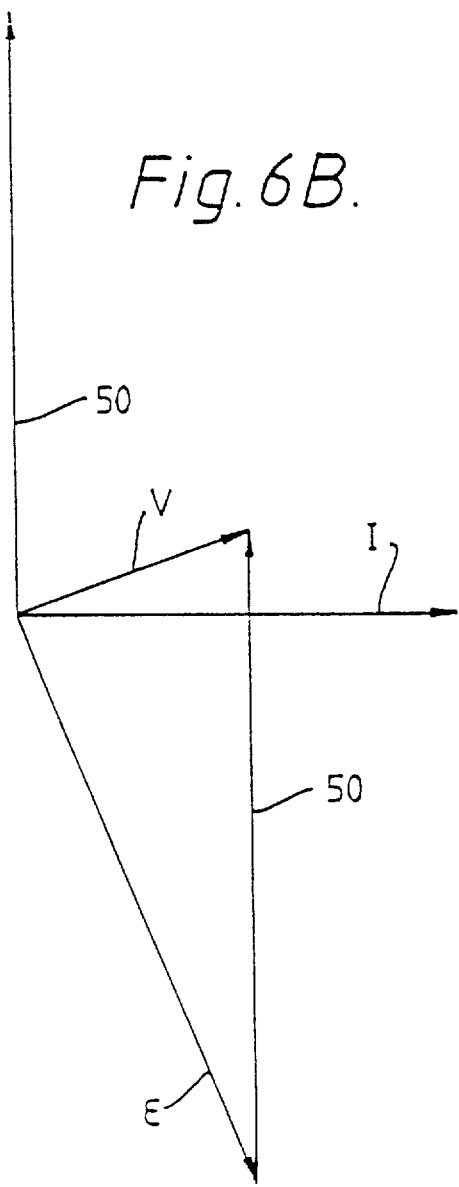
FIG. 6b is a phasor diagram for a motor ad described in FIG. 6a with the motor current lagging the driving voltage and the phasors rotating in the anticlockwise direction.

FIG. 6b is a phasor diagram wherein the motor current I lags the driving voltage V. Again phasor 50 represents the voltage across the motor inductance and when added (vectorially) with the EMF ε, equals the driving voltage V.

Figures 7A, 8:
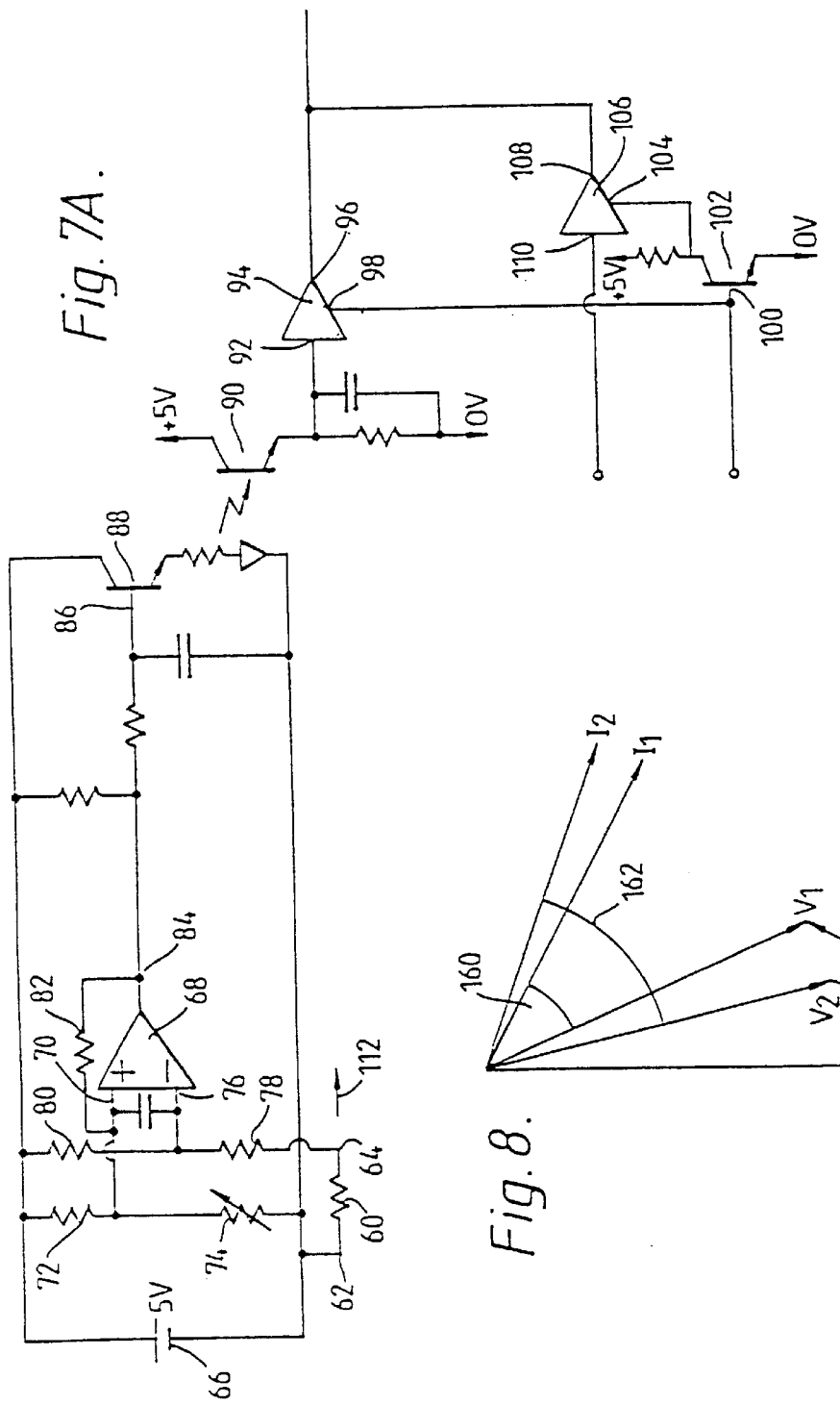
FIG. 7a is a simplified circuit diagram of a current direction sensing circuit as used in accordance with the present invention.
FIG. 8 is a phasor diagram for the phasors shown in FIG. 6a but showing the effects of a change in phase angle between motor current and driving voltage with phasors rotating in the anticlockwise direction.

FIG. 7a shows a circuit which provides the microprocessor with a digital representation of a motor phase current. Referring to FIG. 7a a current sensing resistor 60 is provided between point 62 and point 64 such that resistor 60 is in series with the motor winding, thus referring to FIG. 2, point 62 is connected to one of points $V_A$, $V_B$ or $V_C$ and point 64 is connected to the end of a motor winding shown by one of points 64 in FIG. 2. Referring again to FIG. 7, resistor 60 may be for example 0.25 Ω and the voltage between point 62 and point 64 will be representative of current flowing through the motor winding in which resistor 60 is connected in series. The circuit in FIG. 7 is provided with a supply 66 of for example 5 volts and has a comparator circuit, for example a comparator 68 having a non-inverting input 70 which is maintained at a reference voltage relative to supply 66 by resistor 72 and 74 and an inverting input 76, the potential of which is dependent upon the potential of point 64 and this potential is divided by resistors 78 and 80. The gain of comparator 68 is controlled in the known way by the selection of resistor 82 and the output 84 of comparator 68 provides signals to the base 86 of transistor 88. The emitter of transistor 88 is connected to opto-coupler 90 and the emitter of opto-coupler 90 is connected to an input 92 of tri-state buffer 94. The output 96 of tri-state buffer 94 is connected for example to the A phase rotor position control input of a micro processor which has control means for control and commutation of the ECM 2. Tri-state buffer 94 has a further input 98 which is connected to an EMF or current sensing enable line at input 100 at the base of transistor 102.

The collector of transistor 102 is connected to an input of 104 of a further tri-state buffer 106 and the output 108 of tri-state buffer 106 is also connected to the A phase rotor position control input of the microprocessor which is connected to output 96 of tri-state buffer 94. A back EMF input line is connected to input 110 of tri-state buffer 106. The operation of the circuit of FIG. 7a is as follows. Current flowing through the winding e.g. the A phase winding in which resistor 60 is connected in series will establish a voltage across resistor 60 and dependent on the direction of flow of the current throught the winding the potential of point 64 will be higher or lower than that of point 62. Thus if the current is flowing in the direction indicated by arrow 112 and the potential at inverting input 76 will be lower than that at input 70 and the output of comparator 68 will be high, so a logic high signal will be present at input 92 of tri-state buffer 94.

Assuming that the EMF/current sense enable line is high so that current sensing has been selected by the control circuitry then output 96 of tri-state buffer 94 will be high and a high input will be present at the A phase rotor position input of the micro processor. If current is flowing through the winding in the opposite direction to that shown by arrow 112 then the output of tri state buffer 94 will be low and a low signal will be present at the A phase rotor position input to the microprocessor. When the EMF/current sense enable line is high as above described, then the emitter of transistor 102 will generate a low signal at input 104 to tri-state buffer 106 so that any EMF input from the EMF input line will not be transmitted to the output 108 at the tri-state buffer and will not affect the A phase rotor position input of the microprocessor. However, when the EMF/current sense enable line is low, then input 98 of tri-state buffer 94 will also be low and the output 96 of tri-state buffer 94 will not affect the A phase rotor position control input to the micro processor.

Also, when the EMF/current sense enable line is low then the emitter of transistor 102 will be high to activate tri-state buffer 106 so that the signals present on the EMF input line are transmitted to output 108 of the tri-state buffer and are present on the A phase rotor position control input to the microprocessor. One circuit as shown in FIG. 7 may be used in conjunction with appropriate software to provide information for commutating all the motor phases. However, in the following description the one circuit as shown in FIG. 7 is used in each of the three phases. The three digital single outputs form these circuits are combined to form a three bit current sense input pattern which is analogous to the signals that would be obtained form Hall sensors mounted in the motor. The signal from each phase will remain on for 180 electrical degrees and then go off for 180 degrees. The signals between phases are separated by 60 electrical degrees. Thus for one complete electrical revolution six distinct three bit current sense input patterns will be detected by the microprocessor. These three bit current sense input patterns are used to decode which switching devices should be turned on next. They are also used to provide speed feed back so that the motor speed can be controlled.

FIG. 7b shows current waveforms A, B and C in phases A, B and C and is a timing diagram of current sense mode operation for a given speed. A method to enter this mode will be explained later.

As can be seen from FIG. 7b all commutation events are preceded and followed by a current zero crossing. For example in FIG. 7b the current in B phase passes through zero at point 150 and commutation of the A+ switch (switch 22 in FIG. 2) occurs at point 152. Before point 152 switches A−, B− and C+ (31, 32 and 24 in FIG. 2) where "on". After point 152, switches A+, B− and C+ (22, 32 and 24 in FIG. 2) are "on". When zero crossing 150 occurs a timing means comprising a software timer, Timer A, is reset and begins timing from zero. When the commutation of A+ occurs at point 152 the microprocessor enable its interrupts such that a change in the three bit current sense input pattern generates an interrupt.

When this interrupt occurs, at point 154, the microprocessor saves the value of time A into a memory location (TIME VALUE), then it vectors to an interrupt routine. This routine will be called SENSE INTERRUPT for reference.

After clearing the interrupt flag the microprocessor reads and saves the three bit current sense input pattern from the current sensors. It compares this pattern with the next pattern from a software look up table. This look up table represents the correct commutation sequence. If the patterns are not the same then the microprocessor returns form the interrupt routine and assumes that noise generated the interrupt.

If however the input pattern is the same the microprocessor will reset Time A to count form zero. Timer A effectively measures the time between successive commutations which in normal operation is 60 electrical degrees. It will then divide this value by 60 and multiply by a desired phase delay value to obtain a time period corresponding to a desired phase angle. The result of this calculation (some fraction of sixty electrical degrees) represents a predetermined time period corresponding to the desired phase angle and is programmed in to Timer A's compare and interrupt function. That is when the value of Timer A equals the value calculated, a commutation interrupt will be generated, to commutate the power devices. Note this will occur at point 156 in FIG. 7b.

Thus by sensing power or a component of power such as current in at least one of the motor windings, signals are passed to the control means which allow control of the commutation of power to the ECM. Also, by sensing a part of a current wave form in a first winding information is derived from which the winding, or further windings may have power commutated thereto at a desired time.

FIG. 8 shows the effect of varying the time between the current sense transition and when the commutation occurs. Referring to FIG. 8 and applied power supply voltage is shown as phasor $V_1$, the back EMF is shown as phasor $\epsilon_1$, and there is an angle 160 between the winding current $I_1$, and voltage $V_1$. When the phase angel is increased to angle 162 between $V_2$ and $I_2$, the back EMF $\epsilon_2$ becomes smaller, indicating a drop in motor speed. For a larger phase angle the speed decreases, that is the phase angle can be used for speed control.

It should also be noted that the average voltage phasor is lower even through the same supply voltage is maintained as the phase angle is changed. With the larger phase angle the current and voltage waveforms move in such a way as to cause the free wheel diodes to conduct for longer. During the time for which an upper diode is conducting the phase point is effectively connected to the rail. Whilst a lower diode is conducting it is connected to 0 volts. As the waveforms are symmetrical the average contribution to the driving voltage, from diode conduction, is half supply voltage. Thus a longer diode conduction time lowers the effective driving voltage.

The commutation interrupt is entered when Timer A reaches the value programmed as explained before. The output pattern from the microprocessor is updated, changing the conducting power devices. The three bit current sense input pattern saved in the sense interrupt routine is used as a pointer for the output pattern table.

The new pattern will initially only have two devices turned on. This is called a non-overlap pattern. If the microprocessor commutated from one three phase pattern to the next, one of the totem poles would have its lower (31, 32 or 33 in FIG. 2) being turned on whilst the upper (22, 23 or 24 in FIG. 2) was being turned off (or vice versa). This situation can cause a shoot through condition to occur. A shoot through condition is where an upper and lower device of the same phase are conducting simultaneously and leads to a short circuit across the motor power supply.

Figure 9:
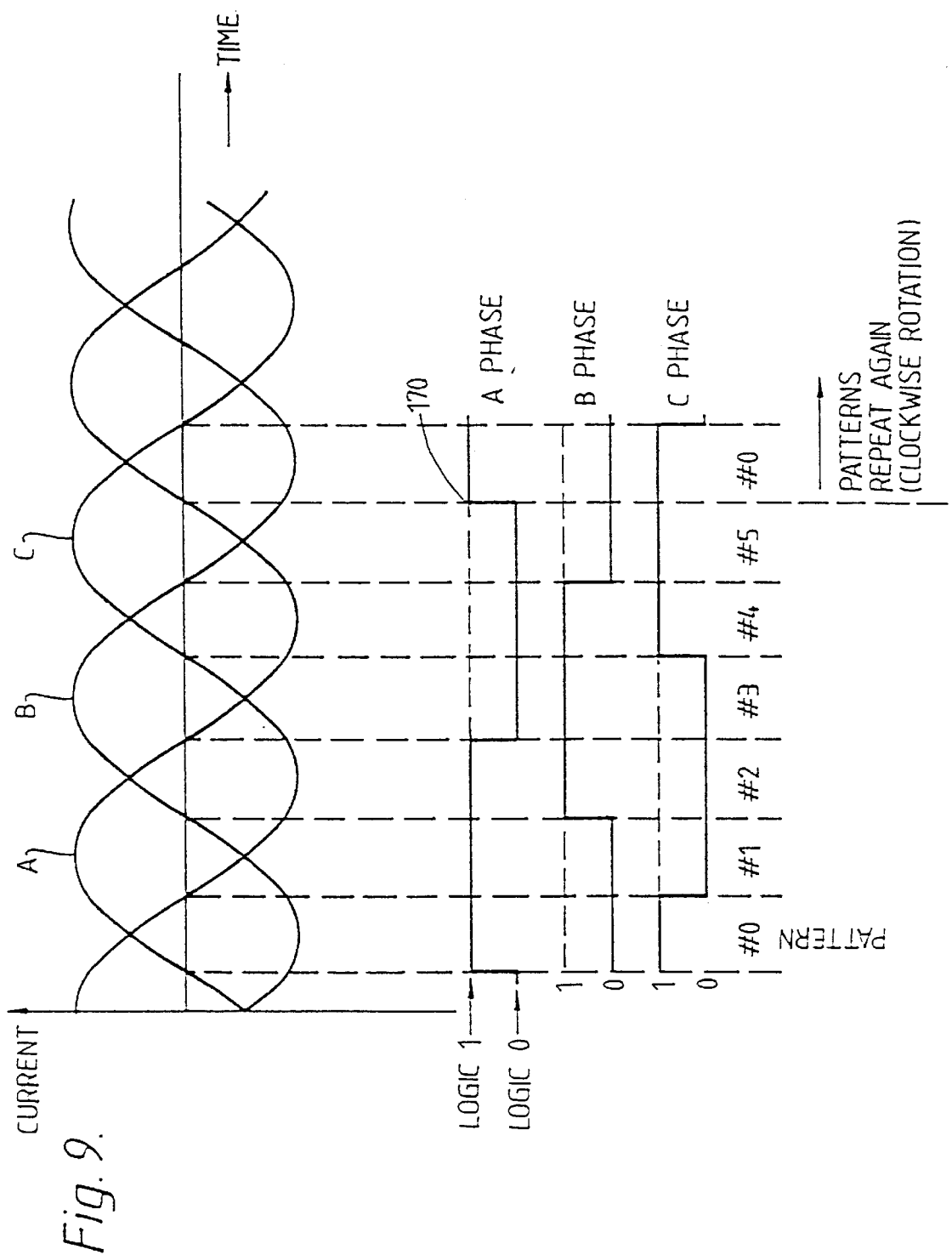
FIG. 9 is a diagram showing a graph of motor winding currents v time and the current sensor output corresponding to winding currents and output commutation patterns in accordance with the present invention.

FIG. 9 shows the current waveforms in the three phases under normal operation and the six, three phase current sense output patterns.

As explained before the three bit current sense input pattern is used as a pointer to get the output pattern from the output pattern table shown in FIG. 12. FIG. 12 shows the three phase output patterns with the intermediate non-overlap patterns. Thus when input pattern 0 is sensed by the microprocessor, the output pattern 0 will be used to select which power devices will be turned on. It is important to note that the output pattern table can be offset from the input pointer to alter the phase relationship between the applied voltage commutated to the motor windings and the current flowing in the windings. The ability to alter the phase relationship increases the range of operating parameters The commutation interrupt routine also decrements a speed loop error counter which is used to control the speed as explained later.

Before returning from the commutation interrupt routine the last operation the microprocessor performs is to increment (in module 6) the pointer which references the table of digital current sense patterns. This means the pointer will now point to the next pattern to be expected. It will also enable the next sense interrupt edge of the current sense circuit (FIG. 7a) output, in the case C phase negative edge 170.

FIG. 10 is a table of expected current sensing patterns or Hall effect or digitised back EMF patterns corresponding to the output patterns 0 to 5 shown in FIG. 9. In FIG. 10, "1" indicated an "on" state or high logic level and "0" indicates an "off" state or low logic level.

The software also maintains, or changes, the desired speed of operation.

Figure 11:
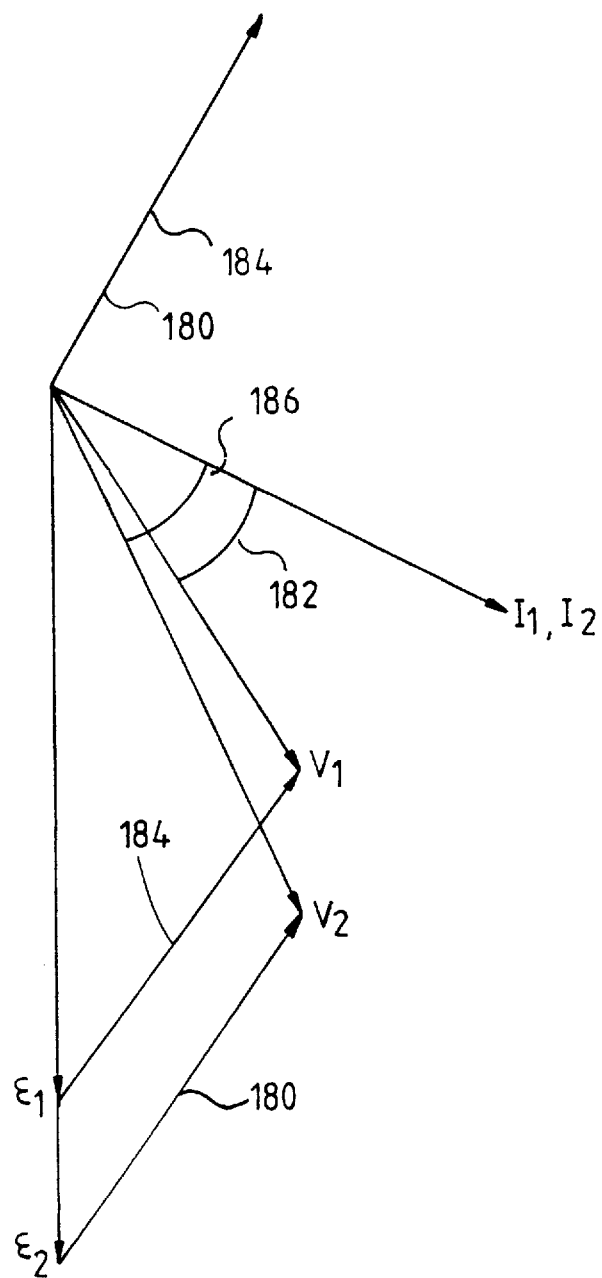
FIG. 11 is a phasor diagram showing the effect of a change in driving voltage for the phasors shown in FIG. 6a and FIG. 8 with the phasors rotating in the anticlockwise direction.

FIG. 11 is a phasor diagram showing the change in current, back EMF and phase angle when the magnitude of the voltage applied to the ECM is increased. Before the increase in applied voltage, the voltage is shown as phasor $V_1$, the current is $I_1$, the back EMF is $\epsilon_1$, and the voltage across the motor inductance is phasor 180. The phase angle between voltage $V_1$ and current $I_1$ is 182. After the magnitude of the applied voltage is increased, the voltage phasor is $V_2$, the current $I_2$, the back EMF $\epsilon_2$ and the voltage across the motor winding is 184. The new phase angle is 186. The new EMF $\epsilon_2$ is greater than $\epsilon_1$, indicating an increase in motor speed. Thus the speed will increase if the driving voltage is increased.

Thus speed control can also be achieved by controlling the pulse width modulation (PWM) of the switching devices as disclosed in the aforementioned U.S. Pat. No. 4,857,814. The duty cycle D or PWM rate is calculated as $D=t_{on}/(t_{on}+t_{off})$. During the "$t_{on}$" period the switching devices are "on" according to the switching patterns shown in FIG. 12. Those switching devices referred to the FIG. 12 are in the "on" state, for example, the reference in FIG. 12 to the "0" outputs non-overlap pattern indicates that switch A+ is "on", switch B– is being controlled by PWM and the switches relating to phase C are "off". During the time "off" the switching devices marked PWM in FIG. 12 are turned "off". This PWM strategy has been developed to maintain the symmetry of the three phase waveforms. The PWM duty cycle is software controlled with the desired ration being obtained by writing a value to a PWM register in the microprocessor. A second Timer B is set up to toggle the PWM output "on" when it reaches its maximum count and returns to zero. When it reaches the value in the PWM register it toggles the output "off". The programmable value for the maximum value of the count determines the PWM frequency.

To implement speed control, a third timer C, is used to set up a time base. This is an interrupt driven timer. The following routine forms the timer interrupt.

The microprocessor first checks a flag called Update PWM. If this is true the value of speed loop error count is written to the PWM register. This flag is set whenever the speed loop error counter is changes (in the commutation interrupt or later in this routine). The register is updated here and not immediately when the value is modified to add to the speed stability.

A register, called LONG TIMER, is updated, this is used in the main routine. Another register called speed is then decremented. If speed does not equal zero then program control returns to the main program. When speed equals zero the speed loop error counter is compared with its maximum allowable value. If it is less than the maximum value it is incremented, the update PWM flag is set true and speed is reset to its reference value. The microprocessor then returns from the interrupt.

It can be seen from the above that value of speed and the timer interrupt frequency will determine the motor speed. If the motor commutation rate is too slow there will be a net increase to the speed loop error counter and hence the PWM register will be incremented. If the commutation rate is too fast the reverse will happen. If the speed is correct there will be no net change to the PWM register value as the speed loop error count will be incremented and decremented once per commutation.

The main loop determines how quickly the PWM register is updated. If the time between updating this register is small then the motor will accelerate quickly. A long timer is used in conjunction with the maximum allowable value for the speed loop error counter to control the acceleration. When a fast acceleration is required the long timer is loaded with a small number. After this value is reached the speed loop error count is allowed to increment in unitary steps to the maximum allowable value.

It is important to control the acceleration rates or else the three phase currents become unstable and the feedback will no longer be available for control. The present implementation coped with PWM updates every 500 milliseconds quite adequately.

As explained before, below a certain speed the motor is commutated using back EMF sensing and above the chosen speed current sensing is used. However for the current sensing technique to work three phase currents must be present for the microprocessor to sense from. A technique was developed to start the three phase current flowing so that three phase current sensing can be used.

First a change speed needs to be chose, for example 300 rpm. The time between commutations is calculated for the chosen speed. Now assume that the motor is rotating at the chosen speed. The microprocessor then waits to the end of a commutation. A flag is set to change the mode of operations from commutation of power to two phases to three phases ie. patterns will be output from the three phase tables referred to with reference to FIGS. 9 and 12 instead of the two phase tables. The required PWM values for a particular speed are very different from two phase to three phase, hence the speed loop control is temporarily disabled and a new PWM value is loaded. This value may be predetermined or interpolated from the present value of two phase PWM. At the next (and last) EMF sense the first three phase pattern is output. The next electrical cycle (six commutations) are made under open loop conditions with a timer without rotor position feed back. This is sufficient time for the three phase currents to established themselves so that the microprocessor can close the loop again and begin sensing off the signals from the current sensors with the current sense line (FIG. 7) enables.

From the foregoing it will be seen that methods of and/or apparatus are disclosed for indicating the position of an ECM when all three phases are being energised and controlling the ECM using such information without the use of Hall effect sensors or optical sensors with the attendant advantages of using less connecting wires and enabling the attainment of higher speeds.

We claim:

1. A method of controlling the speed of a multi-phase electronically commutated motor (ECM) having a stator including energizable windings and a rotor, commutating circuitry to supply commutating voltages to said ECM, rotor position sensing means, commutation control means for controlling said commutation circuitry, and pulse with modulation (PWM) means to control the supply of power commutated to said ECM by said commutation control means, said method comprising: operating said ECM at speeds where the back EMF generated in the windings is greater than or equal to the applied commutating voltage by carrying out the steps of:

i) sensing the rotor position at desired intervals of time, ii) applying appropriate commutating voltages to each said winding so that, during commutation, no phase of said ECM is unenergized and the voltage applied to each said winding leads the back EMF generated in each said winding by a selected constant lead angle, and iii) controlling the supply of power commutated to said ECM with said PWM means to control the speed of said ECM.

2. Apparatus for controlling the speed of a multi-phase electronically commutated motor (ECM) comprising:

a stator including energizable windings and a rotor, commutating circuitry to supply commutating voltages to said ECM, rotor position sensing means for sensing the position of said rotor at desired intervals of time, commutation control means for controlling said commutating circuitry to selectively apply appropriate said commutating voltages to each said winding so that, during commutation, no phase of said ECM is energized and the voltage applied to each said winding leads the back EMF generated in each said winding by a selected constant lead angle and the back EMF generated in the windings is greater than or equal to the applied commutating voltage, and PWM means to control the supply of power commutated to said ECM to control the speed of said ECM.

* * * * *

UNITED STATES PATENT AND TRADEMARK OFFICE
CERTIFICATE OF CORRECTION

PATENT NO. : 5,821,708

DATED : October 13, 1998

INVENTOR(S) : John Julian Aubrey Williams, Christian John Wade Gianni

Page 1 of 2

It is certified that error appears in the above-indentified patent and that said Letters Patent is hereby corrected as shown below:

Column 2, Line 30 "con controlling" should be -- of controlling --

Column 3, Line 29 "sued" should be --used --

Column 3, Lines 47 and 52 "and" should be -- an --

Column 4, Line 14 "generation" should be -- generator --

Column 4, Lines 33 and 50 "and" should be -- an --

Column 4, Line 38 "detailed " should be -- detail --

Column 5, Line 25 "three" should be -- there --

Column 5, Line 51 "and" should be -- an --

Column 5, Line 55 "and" should be -- as --

Column 5, Line 66 "and" should be -- an --

Column 7, Line 18 "throught" should be -- through --

Column 7, Line 53 "single" should be -- signal --

UNITED STATES PATENT AND TRADEMARK OFFICE
CERTIFICATE OF CORRECTION

PATENT NO. : 5,821,708                                  Page 2 of 2
DATED     : October 13, 1998
INVENTOR(S) : John Julian Aubrey Williams, Christian John Wade Gianni It is certified that error appears in the above-indentified patent and that said Letters Patent is hereby corrected as shown below:

Column 7, Line 54 "form"  should be -- from --

Column 7, Line 56 "form"  should be -- from --

Column 8, Line 8 "where"  should be -- were --

Column 8, Lines 26 and 29  "form"  should be -- from --

Column 8, Line 51 "and"  should be -- an --

Column 8, Line 54 "angel" should be -- angle --

Column 10, Line 26 "changes "  should be -- changed --

Column 12, Lines 28-29 "energized"  should be -- unenergized --

Signed and Sealed this

Thirteenth Day of July, 1999

Q. TODD DICKINSON

*Attest:*

*Attesting Officer*     *Acting Commissioner of Patents and Trademarks*